Aug. 25, 1931.   J. EATON   1,820,786
MOTOR CONTROL SYSTEM
Filed July 31, 1929
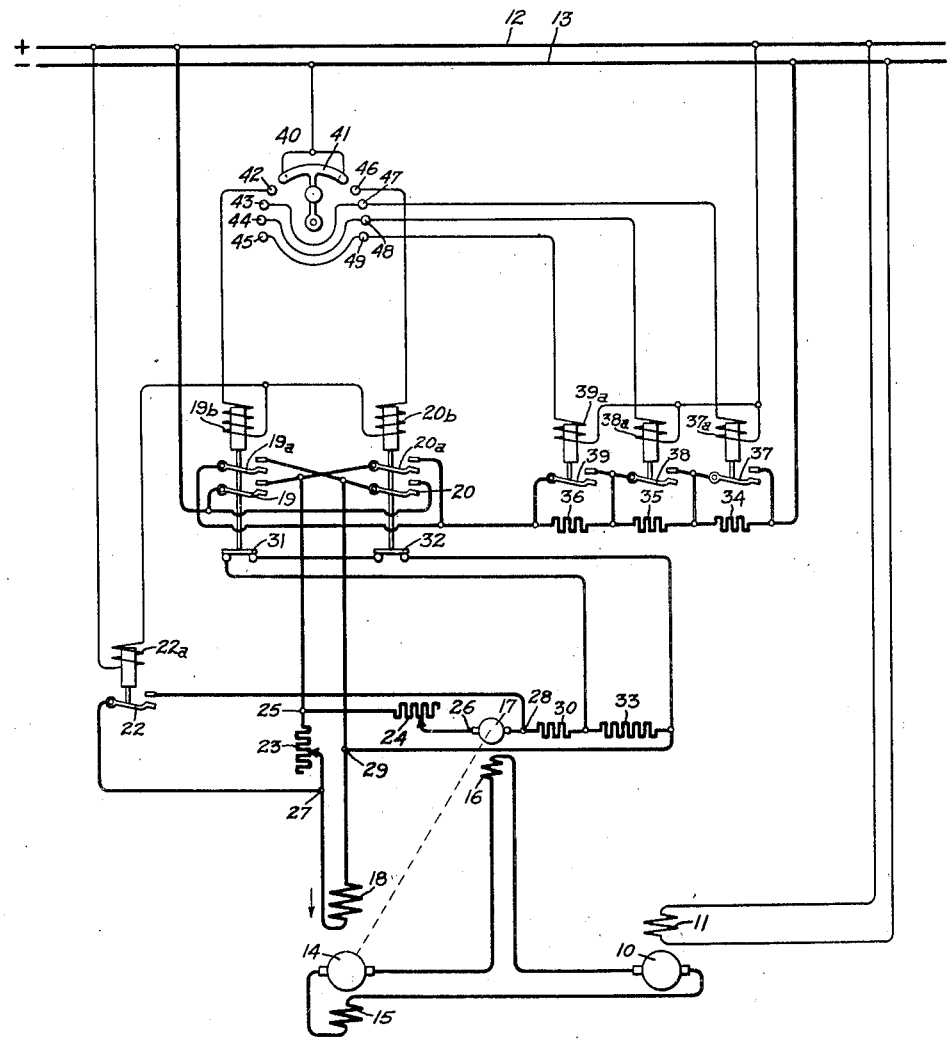
Inventor:
John Eaton,
by Charles C. Mullan
His Attorney.

Patented Aug. 25, 1931

1,820,786

UNITED STATES PATENT OFFICE

JOHN EATON, OF SCHENECTADY, NEW YORK, ASSIGNOR TO GENERAL ELECTRIC COMPANY, A CORPORATION OF NEW YORK

MOTOR CONTROL SYSTEM

Application filed July 31, 1929. Serial No. 382,465.

This invention relates to control systems and more particularly to control systems of the type in which an auxiliary dynamo electric machine is employed to supply a component of the separate excitation to the supply generator of a Ward-Leonard system, and has for an object the provision of a simple reliable and efficient means for reducing the residual magnetism of the generator when the separately excited field winding is disconnected from its source of excitation.

Connections for causing the voltage generated by a generator due to its residual magnetism to weaken or to kill the residual magnetism thereof, have been known before and are usually referred to as "suicide connections." In the past it has been the practice to effect a suicide connection after the field winding has been disconnected from its source merely by connecting the winding to the terminals of the generator in such a manner that current would be caused to flow through the winding in a reverse direction. This expedient although operative and successful in certain types of control systems is open to many serious objections in certain other types of systems. For example in Ward-Leonard elevator installations in which the supply generator is provided both with series and separately excited field windings, the setting of the mechanical brake often effects such a sudden and large increase in the current flowing in the series field winding as to overwhelm the rather feeble opposition produced by connecting the separately excited winding to the armature terminals of the generator. It has even happened that the effect of the series field has been so powerful as to actually drive the motor through the brake.

In illustrating my invention in form thereof I have shown it as applied in a Ward-Leonard control system particularly adapted for elevator work and in which a small auxiliary dynamo electric machine i. e. an exciter is employed to supply a corrective component of the separate excitation of the supply generator.

In carrying my invention into effect, in one form thereof, I provide means for disconnecting the separately excited field winding of the generator from its source of excitation and also from the auxiliary dynamo electric machine together with means for connecting the separately excited field winding with the armature of the auxiliary machine in such a manner that current will be caused to flow through the winding in a direction to reduce the residual magnetism of the generator.

For a better and more thorough understanding of the invention reference should now be made to the following specification and the accompanying drawing, the single figure of which is a simple diagrammatical representation of an embodiment of the invention.

Referring now to the drawing, a suitable direct current electric motor 10 is provided with a separately excited field winding 11 which as shown is connected to any suitable source of supply such as that represented by the two direct current supply lines 12 and 13. Although not shown, the shaft of the motor 10 may be connected to drive any load body such for example as an elevator. It will also be understood that the shaft of the motor will be provided with a suitable brake drum and a cooperating mechanical brake. These elements are so well understood in the art that it is deemed advisable to omit a showing of them for the purpose of simplifying the drawing.

The motor 10 is supplied with direct current from a suitable source of direct current power such as the generator 14 which may be driven by any suitable means such as an alternating current electric motor supplied from any suitable source of power (not shown). As shown in the drawing the armature of the motor 10 is connected to the armature of the generator 14 in a local circuit which includes a series field winding 15 for the generator and a field winding 16 of the small auxiliary dynamo electric machine 17. The generator 14 is provided with a separately excited field winding 18 which is arranged to be connected to the supply mains 12 and 13 by means of suitable reversing contactors 19, 19a, and 20, 20a; contactors 19 and 19a serving to energize the field winding 18 in a direction to cause the motor 10 to drive the elevator in an up direction and contactors 20 and 20a serving to energize the field 18 in a direction to cause the motor 10 to drive the elevator in a down direction as will be understood by persons skilled in the art.

It is to be observed that the armature member of the auxiliary dynamo electric machine 17 is arranged to be connected in series relationship with the separately excited field winding 18 by means of the normally open contactor 22, and that the field winding 16 of the exciter 17 is in series relationship with the supply generator 14 and drive motor 10. A Ward-Leonard system in which an auxiliary dynamo electro machine is employed to supply a component of the excitation of the supply generator is shown and described in United States Patent No. 1,717,823, Max A. Whiting. The functions of the series exciter are thoroughly explained in the above mentioned Whiting patent. In this specification the series exciter 17 will be described simply by the statement that it is connected in the circuit of the field winding 18 for the purpose of supplying to the generator a component of excitation proportional to the load current exchanged between the armature of the generator 14 and the driving motor 10, and for certain other purposes that will be fully explained at a later point in this specification.

In order that a standard auxiliary dynamo electric machine 17 may be used in installations already in operation or in systems having different operating characteristics, an adjustable potentiometer comprising two variable resistors 23 and 24 connected together at a common point 25 is provided; one terminal of the potentiometer being connected to the line terminal 26 of the armature of the exciter 17 and the other terminal of the potentiometer being connected to a terminal 27 of the separately excited field winding 18 and being arranged to be connected to the opposite terminal 28 of the auxiliary exciter 17 when the normally open contactor 22 is operated to the closed position.

When the normally open contactor 22 is closed the armature of exciter 17 will be connected in circuit with the separately excited field winding 18 of generator 14, and since its field winding 16 is energized in accordance with the load current exchanged between the generator 14 and the motor 10 it will supply a component of excitation to the separately excited field winding 18 which is proportional to the load current. The terminal 28 of the exciter 17 may be connected to the opposite terminal 29 of the separately excited field winding 18 through protective resistor 30 and the normally closed contactors 31 and 32. A bridging resistor 33, which is connected in parallel relationship about the normally closed contactors 31 and 32, serves to connect the terminal 28 of the exciter 17 with the terminal 29 of the field winding 18, in the event that either of the normally closed contactors 31 or 32 should for some reason fail to close.

In order that the motor 10 may be accelerated from rest to full running speed, a plurality of accelerating resistors 34, 35 and 36 are connected in circuit between the separately excited field winding 18 of the generator 14 and the source of supply 12, 13. These resistors are arranged to be successively short-circuited by operation to the closed position of the contactors 37, 38 and 39 in response to the energization of the coils 37a, 38a and 39a respectively.

The operation of the contactors 37, 38 and 39 is controlled by a multi-position speed governing controller 40 which as shown consists of a movable segment 41 which is adapted when the segment 41 is operated in a counter clockwise direction from its central or neutral position to make successive engagement with the stationary contact members 42, 43, 44 and 45 and to make engagement with the stationary contact members 46, 47, 48 and 49 when the segment 41 is operated in a clockwise direction from its neutral position.

The normally open contactor 22 is under the control of coil 22a which may be connected to be energized across the supply lines 12 and 13 by operation of the controller 40 from its central or neutral position to its first operative position in either direction.

The energizing coil 19b serves when energized to operate the normally open contactors 19 and 19a to the closed position and simultaneously therewith to operate the normally closed contactor 31 to the open position whilst the coil 20b serves to operate the normally open reversing contactors 20, 20a to the closed position and the normally closed contactor 32 to the open position in response to operation of the controller 40 from its neutral position to its first operative position in either counter clockwise or clockwise direction respectively.

With the above understanding of the elements comprising an embodiment of my invention the operation of the system itself will readily be understood from the detailed description which follows: It will be assumed that the armature of the generator 14 and the armature of exciter 17 mounted upon the shaft of generator 14 is being driven by a suitable driving means and that the separately excited field winding of the motor 10 is energized across the supply lines 12 and 13. If it be desired to cause the motor 10 to rotate in such a direction as to drive the elevator car in an upward direction the segment 41 of the controller 40 will be operated in a counter clockwise direction from its central position to its first operative position in which it engages the stationary contact member 42 to complete a circuit extending from side 12 of the supply line through the coils 22a and 19b, contact 42, segment 41 to the opposite side 13 of the supply line to energize coils 22a and 19b. As a result of the energization of coil 19b, normally open reversing contactors 19 and 19a will be operated to the closed position to connect the terminal 29 of the field winding 18 with side 13 of the supply line through the accelerating resistors 34, 35 and 36; and to connect the common point 25 of the potentiometer with the opposite side 12 of the supply line; and as has been pointed out above normally closed contactor 31 will be operated to the open position to disconnect the terminal 28 of the exciter 17 from the terminal 29 of the separately excited field winding 18. Energization of the coil 22a serves the double purpose of closing the normally open contactor 22 to connect the terminal 28 of the exciter 17 with the terminal 27 of the field winding 18 and of releasing the mechanical brake (not shown) which is provided for the purpose of holding the elevator car in a stationary position in the shaft when the driving motor 10 is deenergized.

As a result of the closing of the reversing contactors 19 and 19a the separately excited field winding 18 of the generator 14 will be energized over a circuit that extends from side 12 of the supply line through reversing contactor 19, the resistor 24, armature member of exciter 17, the contactor 22, field winding 18, terminal 29, reversing contactor 19a, and accelerating resistors 36, 35 and 34 to the opposite side 13 of the supply line. An electromotive force will be generated in the armature 14 of the generator which will cause a current to flow in the armature member of the driving motor 10 in such a direction as to cause the motor 10 to drive the elevator in an upward direction. The speed of the motor may be accelerated by successively operating the controller segment 41 in a counter clockwise direction to engage successively the contacts 43, 44, and 45 and to energize successively the coils 37a, 38a and 39a. The accelerating contactors 37, 38 and 39 will be successively operated to the closed position in response to the energization of the coils 37a, 38a and 39a successively to short-circuit the accelerating resistors 34, 35 and 36, the result of which will be to increase the current flowing through the field winding 18 and, therefore, the current delivered by the generator 14 to the motor 10 will cause the motor 10 to be brought up to its full running speed as will be well understood by persons skilled in the art.

As is described and explained in the above mentioned Whiting patent the exciter 17 will be energized in accordance with the load current exchanged between the generator 14 and the driving motor 10 and as a consequence it will supply a component of excitation to the separately excited winding 18 of the generator.

When it is desired to stop the elevator car at any desired floor the controller 40 will be thrown to the central or neutral position, the effect of which will be to deenergize successively the coils 39a, 38a, 37a, 19b and 22a. Deenergization of the coils 39a, 38a, and 37a permits the normally open contactors 37, 38 and 39 to be operated to the open position to reinsert the resistors 34, 35 and 36 in circuit with the field winding 18, whilst deenergization of the coil 19b serves to operate the reversing contactors 19, 19a to the open position and to disconnect the field winding 18 from the supply lines 12, 13. As a result of the deenergization of coil 22a, the mechanical brake is allowed to set, i. e., to grip the brake drum and slow down the motor 10 and also to permit the normally open contactor 22 to be operated to the open position to disconnect the field winding 18 from the terminal 28 of the exciter and the normally closed contactor 31 to be operated to the closed position. It will be clear that if some provision were not made for reducing the residual magnetism of the generator 14 that the setting of the brake would cause the motor 10 to draw such an enormous current from the generator 14 that the magnetism due to the series field winding 15 would again be built up and in turn the voltage generated by the generator 14 would be increased to the point where the current delivered to the motor 10 would be sufficient to drive the motor through the brake. If it be assumed that the conductor 12 is the positive side of the line as indicated by the plus sign, then it will be clear that in the operation explained above the current flows through the field winding 18 in a direction indicated by the arrow. The field winding 16 of the exciter 17 is wound in such a direction to cause the terminal 28 of the exciter 17 to be positive when the generator 14 is delivering current to the motor 10. Thus, it will be seen that the opening of the normally open contactor 22 and the closing of the normally closed contactor 31 serves to connect the field winding 18, the potentiometer 23, 24 and the armature 17 of the exciter in a local series loop circuit through the normally closed contactors 31 and 32 and since the terminal 28 is positive exciter 17 will supply current through the field winding 18 in a direction the reverse of that in which the current flowed when the field winding 18 was excited from the supply line. Since the exciter 17 is designed to generate a considerable voltage say from 60 to 90 volts when normal load current is flowing in its field winding 16, the result of the connection of the exciter 17 to supply current through field winding 18 in the reverse direction will be to oppose and destroy the residual magnetism of the generator 14 and thus to cause the motor 10 to be brought quickly and evenly to rest by its mechanical brake.

In the event that the load on the motor 10 is an overhauling load, i. e., the weight of the elevator overbalances the counter weight, the current through the field winding 16 of the exciter will, of course, be in the reverse direction and the terminal 28 of the exciter 17 will then be negative at the time when the controller 40 is thrown to the neutral position. However, the application of the mechanical brake to the brake drum serves to place a load upon the motor 10 and to cause the generator 14 to reverse and act as a generator again and to supply current to the motor. As a result of this reversal of the direction of current flow in the field winding 16 of the exciter, the terminal 28 again becomes positive and current is caused to flow through the separately excited field winding 18 in a direction to oppose the residual magnetism of the generator and to reduce it to a minimum in the manner already explained above.

In the event that either of the normally closed contactors 31 and 32 should fail to close in response to deenergization of their respective coils 19b, 20b, it will be seen that the terminal 28 of the exciter will nevertheless be connected to the terminal 29, through the resistor 33 and the suicide operation will proceed in the manner described above.

If it be desired to cause the elevator car to be lowered the controller 40 may be operated from its central or neutral position in a clockwise direction and the operation will be the same as that already described for the hoisting of the car as will be readily understood by persons skilled in the art; the sole difference in the operation being that the reversing contactors 20 and 20a will be operated to the closed position in response to energization of the coil 20b and that reverse polarity will be applied to the terminals 27, 29 of the separately excited field winding 18 of the generator 14, the result of which will be to cause the generator to deliver current to the motor 10 in the reverse direction and to cause the motor 10 to drive the car in a downward direction. Also the polarity of the exciter 17 is reversed due to the reversal of the direction of the current supplied to motor 10. Consequently when the controller 40 is operated to the neutral position to stop the car and the contactor 22 opened and contactor 32 closed, exciter 17 will oppose and reduce the residual magnetism of field winding 18 in a manner that will be readily understood from the preceding description of this operation for the upward direction of the car.

Although in accordance with the provisions of the patent statutes, I have described my invention as embodied in concrete form as represented by specific elements and apparatus, it is to be understood that the invention is not limited to the particular elements shown in the drawing which are merely illustrative since modifications and alterations will readily suggest themselves to persons skilled in the art without departing from the true spirit of the invention.

What I claim as new and desire to secure by Letters Patent of the United States, is:

1. In a control system, the combination with a main dynamo electric machine provided with a field winding and a separate source of excitation therefor, of an auxiliary dynamo electric machine connected in circuit with said winding for supplying a component of excitation thereto, and means for disconnecting said winding from said source and said auxiliary machine and for reconnecting said auxiliary machine to said winding to supply current thereto in a direction to oppose the residual magnetism of said main dynamo electric machine.

2. In combination, a generator provided with a field winding, a separate source of excitation therefor, an exciter connected in circuit with said winding to supply a component of excitation thereto, means for disconnecting said winding from said source and said exciter, and means for reconnecting said exciter with said winding in a direction to reduce the residual magnetism of said generator.

3. In a control system, a generator provided with a field winding, a separate source of excitation for said field winding, a regulating dynamo electric machine connected in series relationship between said source and said winding, means for disconnecting said winding from said source, and from said regulating dynamo electric machine, and means for reconnecting said regulating machine with said winding to establish current flow in the opposite direction through said winding.

4. In combination, a generator provided with a separately excited field winding, a separately excited motor having its armature connected in a local circuit with the generator armature, an auxiliary dynamo electric machine provided with an exciting member connected to be energized in accordance with the load current exchanged between said generator and said motor for regulating the value of the potential at the armature terminals of said motor, and means for disconnecting said field winding from its source to deenergize said winding and for reconnecting said exciter with said winding to supply current thereto in the reverse direction to destroy the residual magnetism of said generator.

5. In a control system, the combination with a generator provided with a field winding, of a separate source of excitation therefor, connections between said source and the terminals of said winding, an exciter, a potentiometer included in said connections and connected between one terminal of said exciter and one terminal of said winding, a connection between the opposite terminal of said exciter and said winding terminal to provide an additional component of excitation to said winding, means for disconnecting said winding from said source and said opposite exciter terminal from said winding, and means for connecting said opposite exciter terminal with the opposite terminal of said winding to establish current flow through said winding in a direction to oppose the residual magnetism of said generator.

6. In a control system the combination with a generator provided with a field winding and a separate source of excitation therefor, of an exciter, a potentiometer connected from one terminal of said winding to one terminal of said exciter, a connection between said winding terminal and the opposite terminal of said exciter for supplying a component of excitation to said winding, means for disconnecting said winding from said source and from said exciter and means for connecting said opposite exciter terminal with the opposite terminal of said winding to form a closed loop and to establish current flow through said winding in a direction to oppose the residual magnetism of said generator.

7. In combination in a control system a dynamo electric machine provided with a field winding, a separate source of excitation for said winding, an auxiliary dynamo electric machine, a controller, means operable in response to an operation of said controller for connecting said source to said winding to supply excitation thereto and to connect said auxiliary machine in circuit therewith to supply a component of excitation thereto, and operable in response to another operation of said controller for disconnecting said winding from said source and for reconnecting said winding with said auxiliary machine to establish current flow in said winding in the reverse direction.

8. A control system comprising in combination, a generator provided with a field winding, a separate source of excitation therefor, a series loop circuit comprising an exciter, a potentiometer, said field winding, and normally open contacts, a bridging connection including normally closed contacts between one terminal of said exciter and one terminal of said field winding, a controller, and means operable in response to an operation of the controller for closing said normally open contacts and opening said normally closed contacts to connect said winding to said source through said exciter, and operable in response to another operation of said controller for opening said normally open contacts to disconnect said winding from said source and for closing said normally closed contacts to reestablish said loop and to circulate current through said winding in the reverse direction to destroy the residual magnetism of said generator.

9. In a control system the combination with a generator provided with a field winding and a separate source of excitation therefor, of an exciter and a potentiometer connected between one terminal of said exciter and one terminal of said field winding, connections including normally open contacts between said winding terminal and the opposite terminal of said exciter, connections including normally closed contacts between said opposite exciter terminal and the opposite terminal of said field winding, a controller, and means operable in response to an operation of said controller for opening said normally closed contacts, closing said normally open contacts and connecting said winding to said source through said exciter, and operable in response to another operation of said controller for opening said normally open contacts to disconnect said winding from said exciter and said source, and for closing said normally closed contacts to establish current flow through said winding in a direction to destroy the residual magnetism of said generator.

In witness whereof, I have hereunto set my hand this 30th day of July, 1929.

JOHN EATON.